US011190520B2

(12) United States Patent
Mercuri et al.

(10) Patent No.: US 11,190,520 B2
(45) Date of Patent: Nov. 30, 2021

(54) BLOCKCHAIN SMART CONTRACTS FOR DIGITAL ASSET ACCESS

(71) Applicant: Microsoft Technology Licensing, LLC, Redmond, WA (US)

(72) Inventors: Marc Edward Mercuri, Bothell, WA (US); Paayal Vora, Seattle, WA (US); Raj Shekhar Shukla, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 16/261,448

(22) Filed: Jan. 29, 2019

(65) Prior Publication Data

US 2020/0162473 A1    May 21, 2020

Related U.S. Application Data

(60) Provisional application No. 62/769,766, filed on Nov. 20, 2018.

(51) Int. Cl.
*H04L 29/06* (2006.01)
*G06Q 20/38* (2012.01)
*G06F 16/23* (2019.01)

(52) U.S. Cl.
CPC ........ *H04L 63/102* (2013.01); *G06F 16/2379* (2019.01); *G06Q 20/389* (2013.01); *H04L 63/20* (2013.01); *H04L 2209/38* (2013.01)

(58) Field of Classification Search
CPC ... H04L 63/102; H04L 63/20; H04L 2209/38; G06F 16/2379; G06Q 20/389
See application file for complete search history.

(56) References Cited

U.S. PATENT DOCUMENTS

| 2018/0137465 | A1 | | 5/2018 | Batra et al. |
| 2019/0156923 | A1 | * | 5/2019 | Kain ..................... G16H 10/20 |
| 2019/0197532 | A1 | * | 6/2019 | Jayachandran .... G06Q 20/3829 |
| 2019/0205884 | A1 | * | 7/2019 | Batra ................. G06Q 20/3827 |

FOREIGN PATENT DOCUMENTS

| KR | 20200044363 A | * | 4/2020 | |
| WO | WO-2018019364 A1 | * | 2/2018 | ........... H04L 47/828 |
| WO | 2018149504 A1 | | 8/2018 | |

OTHER PUBLICATIONS

"International Search Report and Written Opinion Issued in PCT Application No. PCT/US19/061057", dated Mar. 30, 2020, 10 Pages.

* cited by examiner

*Primary Examiner* — Arvin Eskandarnia
(74) *Attorney, Agent, or Firm* — Alleman Hall Creasman & Tuttle LLP (57) ABSTRACT

A computing device includes a communications interface that communicatively couples the computing device with a plurality of other computing devices that collectively maintain a blockchain. A storage machine holds a plurality of blocks comprising the blockchain, where a particular block of the plurality defines a smart contract. The smart contract includes: (i) a first access criterion granted to an entity for a digital asset, and (ii) one or more functions that, when an associated condition is satisfied, change the first access criterion to a second access criterion, the condition being satisfied when one or more variables have specific values. A logic machine is configured to receive a current value of a variable and determine that the current value satisfies the associated condition. A request is transmitted to the plurality of computing devices to update the first access criterion to the second access criterion.

20 Claims, 7 Drawing Sheets

BLOCKCHAIN SMART CONTRACTS FOR DIGITAL ASSET ACCESS

CROSS REFERENCE TO RELATED APPLICATIONS

This application claims priority to U.S. Provisional Patent Application Ser. No. 62/769,766, filed Nov. 20, 2018, the entirety of which is hereby incorporated herein by reference for all purposes.

BACKGROUND

A blockchain can be described as a distributed ledger, in which transactions, events, or other data entries are collectively recorded and stored by a plurality of computing devices, referred to as nodes. Blockchain technology is often used in tracking exchange of digital coin-based currencies. As new transactions or events occur, new blocks are added to the chain by all computing device nodes, while existing blocks are preserved and remain unchanged.

DETAILED DESCRIPTION

As discussed above, blockchain technology serves as the foundation for many digital coin-based currencies. Using blockchain, transactions or other relevant events are recorded in a distributed ledger that is collectively maintained by a large number of networked computing devices. Because the blockchain is redundantly stored on many devices, tampering with or deletion of any particular copy of the blockchain should not affect the blockchain as a whole, as other computing devices maintaining the blockchain will reject the change. Only valid, authorized blocks are approved and added to the chain. This alleviates the need for a central institution, such as a bank or national government, to serve as a mediator or recordkeeper.

However, blockchain technology can be practically applied to many computer-based fields beyond digital currencies. For instance, many owners and users of digital assets struggle to manage and enforce access to such assets. Presently, access rights are typically tracked by the asset owner, which may maintain a database defining the various criteria under which their digital assets may be accessed by third parties. This can grow complicated even in ideal scenarios, and can be almost impossible to track and enforce when time restrictions, geographic restrictions, breaches of contract, etc., are considered.

For instance, after an entity A is granted access to a particular digital asset (e.g., a subscription to a database of financial security metadata), the entity may in turn share their access with another entity B. In this example, such entities may include subscribing customers, providers of financial analysis tools, platform owners that leverage access to the asset to enable unique functionality on their platforms, etc. Should entity A miss a payment, this may result in cancellation of entity A's access to the asset, although it may not be immediately apparent to all parties involved if this also affects the access granted to entity B. Similarly, in some scenarios entity B may have the option to, as part of a subscription or agreement, share access to the asset with additional entities C and D, whose access may also be called into question when the access rights of entities A and/or B are changed. Such decisions are often made on a case-by-case basis by the asset owner, which can make it difficult to determine and enforce which entities have access to which digital assets at any given time. As will be discussed in more detail below, a "digital asset" may take any suitable form, and a financial database is only a non-limiting example. As other examples, the digital asset may include digital audio or video content, books, documents, websites, databases, and/or any other suitable digital information.

Accordingly, the present disclosure describes a blockchain computing device that can track and automatically update the criteria under which digital assets can be unlocked and accessed by third parties over a network. Such a blockchain computing device may maintain a blockchain in conjunction with a plurality of other computing devices over a network. Individual blocks of the blockchain may track the access criteria granted to one or more entities for one or more digital assets. In some cases, these blocks may implement "smart contracts" that define the access criteria and can include computer logic that automatically updates the access criteria when certain conditions are met. For example, a smart contract may define an access criterion granted to an entity A for a particular digital asset, as well as logic that automatically limits or revokes the entity's access should entity A miss a payment. In this manner, the present disclosure applies blockchain technology toward the practical application of unlocking digital assets for access by third parties. This improves upon conventional computerized means for access management, as it alleviates the need for a single centralized institution that enforces asset access in favor for a universal, automatic, and consistent decentralized solution.

Figure 1:
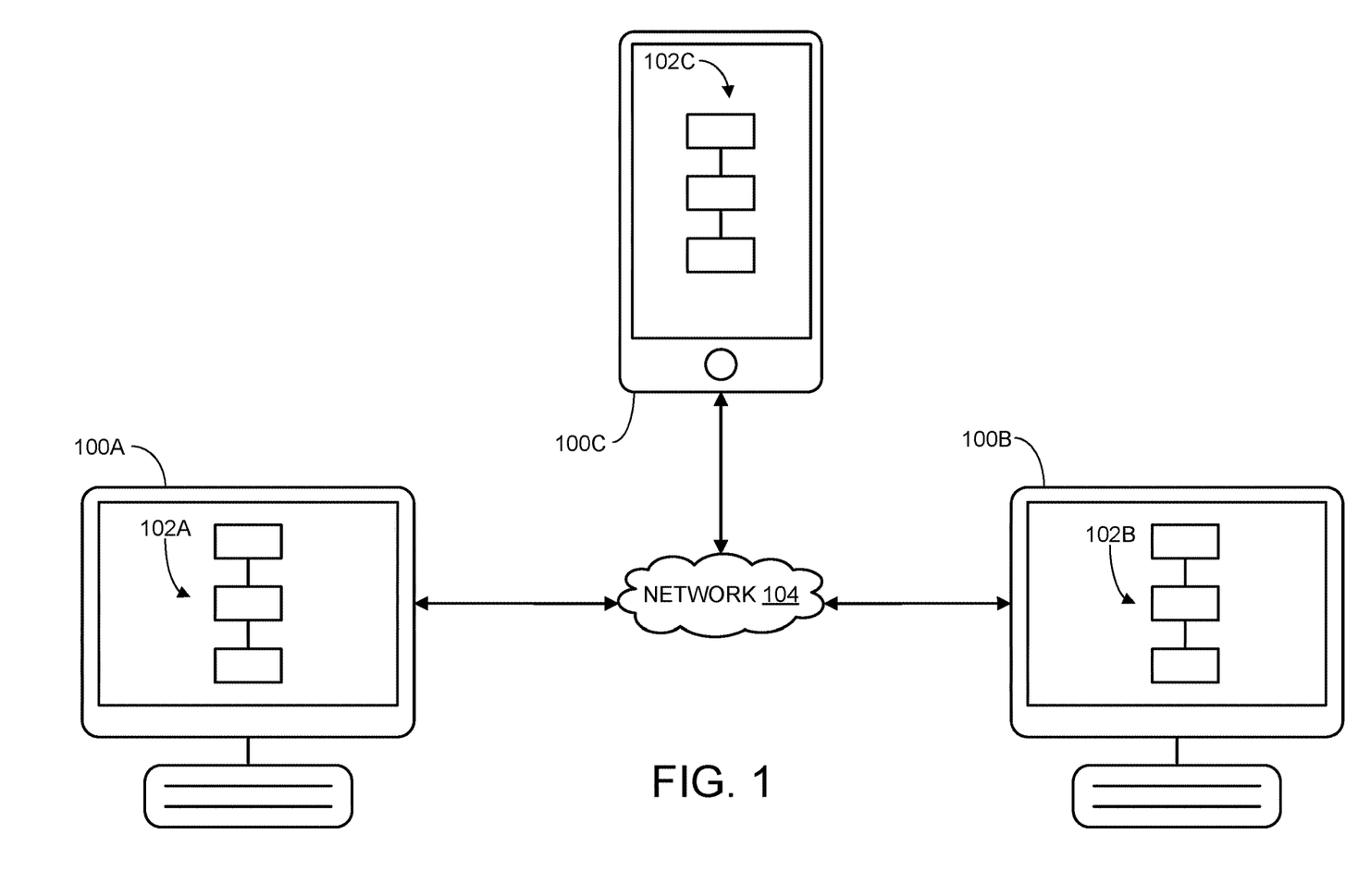
FIG. 1 schematically illustrates a plurality of computing devices collectively maintaining a blockchain.

FIG. 1 schematically illustrates a plurality of computing devices 100A, 100B, and 100C collectively maintaining a blockchain 102 over a network 104. Each computing device may include a communications interface configured to communicatively couple the plurality of computing devices over the network. In the illustrated example, computing devices 100A and 100B take the form of desktop computers, while computing device 100C takes the form of a mobile device. It will be understood that these are nonlimiting examples, and that a computing device used to maintain a blockchain, referred to herein as a "blockchain computing device," may have any suitable hardware configuration and form factor. As examples, a blockchain computing device may take the form of a desktop computer, laptop, server, mobile device (e.g., smartphone, tablet), wearable device, media center, etc. In some examples, computing devices 100A-100C may be implemented as computing system 700 described below with respect to FIG. 7.

Only three computing devices are shown in FIG. 1. However, this is for illustration purposes only. In practical usage, a blockchain may be collectively maintained by any number and variety of computing devices. Such computing devices may be separated by any physical distance and may communicate over any suitable network, including private networks, public networks such as, for example, the Internet, and/or hybrid network environments. Furthermore, the computing devices may be owned and maintained by any number of different individuals or organizations. In some examples, the blockchain may be publicly accessible, in which substantially anyone can download and maintain a local copy of the blockchain. Alternatively, access to the blockchain may be restricted to known users or parties (e.g., only those who own have a stake in a digital asset that is recorded on the blockchain), in which case the blockchain may be referred to as a "private blockchain." Regardless of whether the blockchain is public or private, involved parties may optionally be referred to anonymously, for instance using unique identifiers that are not used outside of the blockchain and cannot be tied to a real-world entity.

As shown, each of the computing devices 100A-100C maintains its own local copy 102A-102C of the blockchain. Because the blockchain is collectively maintained by the plurality of computing devices, each local copy of the blockchain should be substantially identical in typical usage. Should any particular computing device determine that the blockchain should be changed (e.g., by adding a new block), it may transmit a proposed update to the other computing devices in the plurality. Depending on the implementation, this proposed update may take a variety of suitable forms, as will be discussed below, and may be evaluated for compliance by other computing devices of the plurality before incorporation into the blockchain. Assuming the proposed update is compliant, the other computing devices of the plurality may incorporate the proposed update into their local copies of the blockchain, meaning each local copy will continue to be substantially identical. If the proposed update is non-compliant (e.g., because it includes fraudulent information), then the other computing devices may reject its addition to the blockchain. In this manner, each party associated with the blockchain can be confident that any particular copy of the blockchain they access will reflect an overall consensus.

Figure 2:
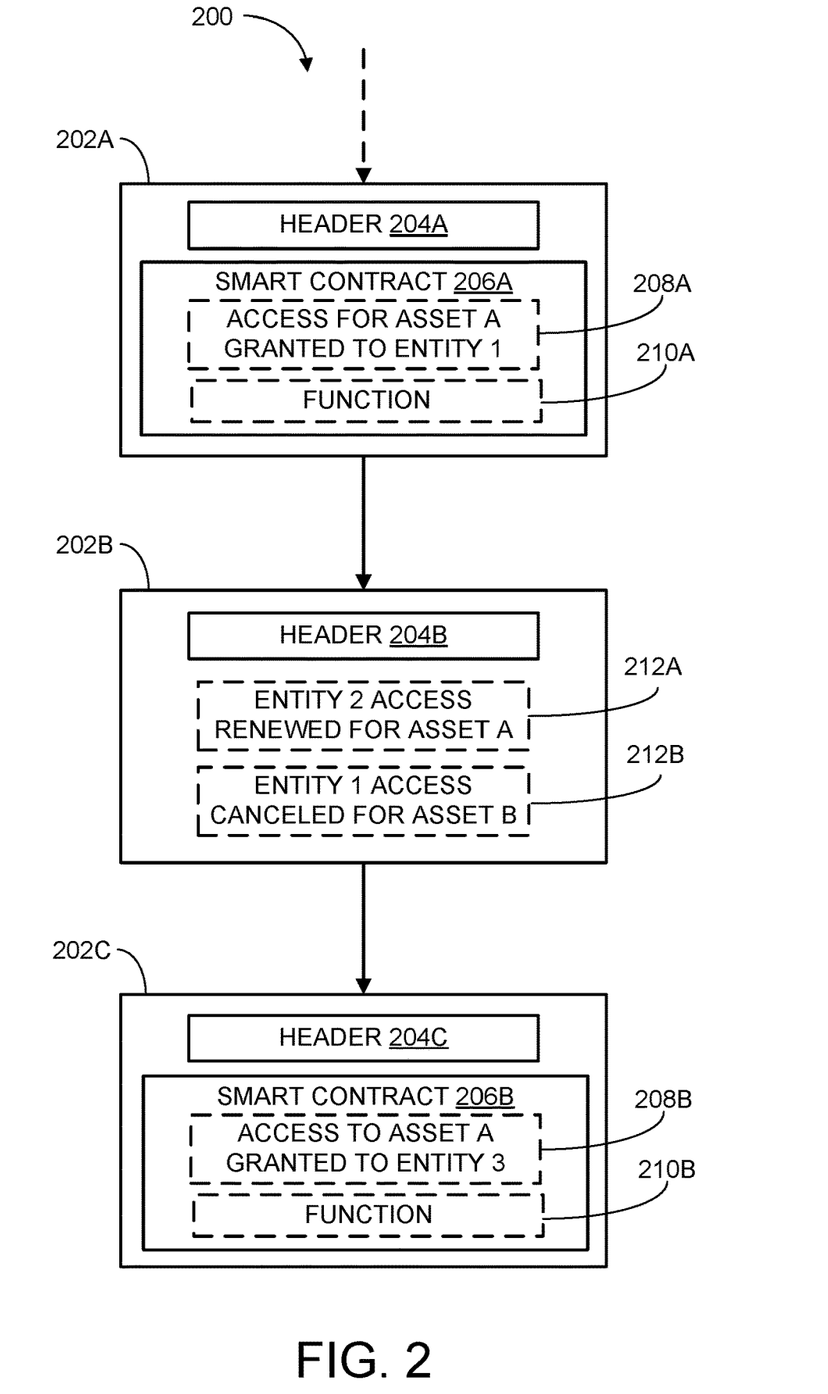
FIG. 2 schematically illustrates blocks in an example blockchain.

FIG. 2 schematically shows an example blockchain 200 in more detail. As shown, blockchain 200 includes a plurality of blocks, including three blocks labeled as 202A-202C. It will be understood that a blockchain may include any arbitrary number of blocks.

Depending on the implementation, each block in the chain can include a variety of suitable information. In typical scenarios, each block will include a header and a listing of transactions, events, or other data entries. In FIG. 2, blocks 202A-202C include headers 204A-204C. A block header often includes a hash of the previous block in the chain. A hash can be described as a unique "fingerprint" of a piece of digital information and can be calculated using a variety of suitable hashing algorithms, including MD5 and SHA-256 as nonlimiting examples. Inclusion of prior block hashes serves to validate the sequence of blocks in the chain, as each block should be succeeded by a block including a corresponding hash value, and also provides a defense against modifications to the chain, as even minor changes to a block will affect its hash value. In other words, header 204B may include a hash of block 202A, while header 204C may include a hash of block 202B.

Similarly, a block header may in some cases include a proof-of-work used to verify the block's authenticity. For example, in some blockchain implementations, individuals or organizations referred to as "miners" compete to computer generate new blocks for the chain. This involves validating that pending transactions are consistent with the existing blockchain and generating a hash value for the new block that meets certain criteria, referred to as a "proof-of-work." Once a suitable hash value has been generated, a new block can be created and transmitted to the plurality of computing devices maintaining the blockchain. Because the proof-of-work is included in the new block, it is accepted as valid and added to the blockchain.

Additionally, or alternatively, a block header may include some representation of the transactions or events recorded in the block. For example, in some blockchain implementations, each block includes a Merkle tree that summarizes the transactions or events recorded in the block. This can serve as another indicator that the data found in the block has not been corrupted or tampered with.

In addition to a header, each block in a blockchain will typically include a list of transactions, events, or other relevant data entries. For example, in digital currency implementations, each block will typically include some number of transactions that record exchanges of currency between different parties. Other blockchain implementations may record other types of data in each block. Accordingly, the listed entries in a block, distinct from the block headers described above, will be referred to herein as "data entries."

As discussed above, the present disclosure describes a practical application of blockchain technology toward the problem of selectively granting access to digital assets. A "digital asset" as used herein may refer to any digital information that one or more parties may seek to access, use, or consume. As one example, a digital asset may take the form of a database of financial information curated by an aggregator. Various other parties—e.g., businesses, financial analysts, news sources—may wish to access such data, and thus may pay for such access. As other examples, digital assets may include digital audio or video content, books, documents, websites, databases, and/or any other suitable digital information.

Automatic management and updating of access to digital assets may be achieved through the use of smart contracts. In FIG. 2, block 202A of blockchain 200 defines a smart contract 206A. A smart contract is a data structure that automatically performs certain actions when previously-specified events occur. For example, when predetermined conditions are met, a smart contract can perform transactions (e.g., reads and writes) that can modify the state of the smart contract and/or trigger events that can be monitored by external entities. In an example scenario, a smart contract may be configured to transfer ownership of a particular asset (e.g., vehicle) from one party to another upon confirmation of payment. Once the smart contract receives an indication that the payment has been made, the smart contract may automatically record a transaction specifying the change in ownership of the asset. Because the smart contract is held in a block on a blockchain, the change in ownership may similarly be recorded in a new block which is eventually added to every instance of the blockchain maintained by a plurality of computing devices. Thus, the parties involved in the transaction can easily verify the existence and nature of the smart contract, check whether the transaction has occurred, and check the current ownership status of the asset.

In more complicated scenarios, smart contracts may include any number of functions that can perform any number of actions when associated conditions are met. In general, a smart contract will have a state, which may, for example, define an agreement reached between two parties (e.g., access criteria for a digital asset), as well as one or more functions, which may be implemented as if/then statements that perform actions when associated conditions are met. These functions may be defined in terms of variables, such that when one or more variables have previously-specified values, a condition is satisfied and the function is triggered. This is illustrated in FIG. 2, as smart contract 206A defines a first access criterion 208A granted to an entity for a digital asset, as well as a function 210A that, when an associated condition is met, changes the first access criterion to a second access criterion. In FIG. 2, the first access criterion 208 specifies that an entity 1 has been granted access to a digital asset A. As an example, if a payment is missed, function 210A may automatically update the access criterion, for example to limit or entirely restrict entity 1's access to digital asset A.

On a technical level, a smart contract may be implemented as computer code defined by one or more data entries within one or more blocks in a blockchain. Such computer code may be written in any suitable coding language, depending on the specific implementation. Because the blockchain is distributed between a plurality of computing devices, the computer code comprising the smart contract may run on any of the plurality of devices, or on all devices simultaneously. In a typical example, one or more devices of the plurality will receive some indication (e.g., the current state of a variable) that pertains to the smart contract, causing the smart contract to execute and update access criteria for a digital asset.

Though the present disclosure focuses on a scenario in which the smart contracts are stored an executed in blocks of a blockchain (i.e., "on-chain"), various "off-chain" scenarios are also within the scope of this disclosure. In other words, the smart contract may run and execute on a computing device that monitors the blockchain, although does not maintain a local copy. As one example, a dedicated computing system may store and execute the smart contract, as well as monitor conditions relevant to the smart contract—e.g., payment status. Nevertheless, upon determining that a relevant condition has been satisfied, the computing device may request an update to the blockchain, as will be described in more detail below.

When access criteria for a digital asset are, the update may be recorded in the blockchain as a new data entry that is automatically generated by the smart contract and eventually added to a new block. In FIG. 2, block 202B includes two data entries 212A and 212B reflecting updates to access criteria granted to various entities for various digital assets. Specifically, data entry 212A specifies a change to the access criteria held by an entity 2 for digital asset A, allowing the entity to access the asset for a longer period of time. Similarly, data entry 212B specifies that the access granted to entity 1 for a digital asset B has been canceled. Such data entries may be automatically generated by smart contracts stored on the blockchain as discussed above. Furthermore, block 202C includes another smart contract 206B, which in turn includes a first access criterion 208B granted to an entity 3 for digital asset A, as well as a function 210B. Thus, various blocks in the blockchain may define smart contracts that include access criteria granted to multiple different entities for a particular digital asset, as well as smart contracts that include access criteria granted to the same entity for multiple digital assets. In general, a blockchain may track access criteria for any number of entities and digital assets.

Updating an access criterion may encompass a variety of potential changes to an entity's access to a digital asset. As examples, the smart contract may expand access to the digital asset (e.g., extend a time period during which the asset can be accessed, relax restrictions associated with the entity's access, expand a scope of the entity's access); unlock access to the digital asset for a new party; constrain access to the digital asset by the entity (e.g., terminate the access, reduce a time period during which the asset can be accessed, increase restrictions associated with the entity's access); etc. Furthermore, such changes to the access criteria may be made upon satisfaction of any number of conditions, such as the expiration of a limited access time, receipt of a payment, an indication that a payment is past-due or insufficient, a request to share or transfer access to another party, a request to expand or restrict the access—for instance in exchange for a corresponding increase or decrease in price, etc. It will be understood that any suitable condition may be satisfied, including those not related to business transactions. As additional examples, a condition may be satisfied based on weather conditions, sporting event outcomes, political elections, and/or virtually any other observable phenomena.

Figure 3:
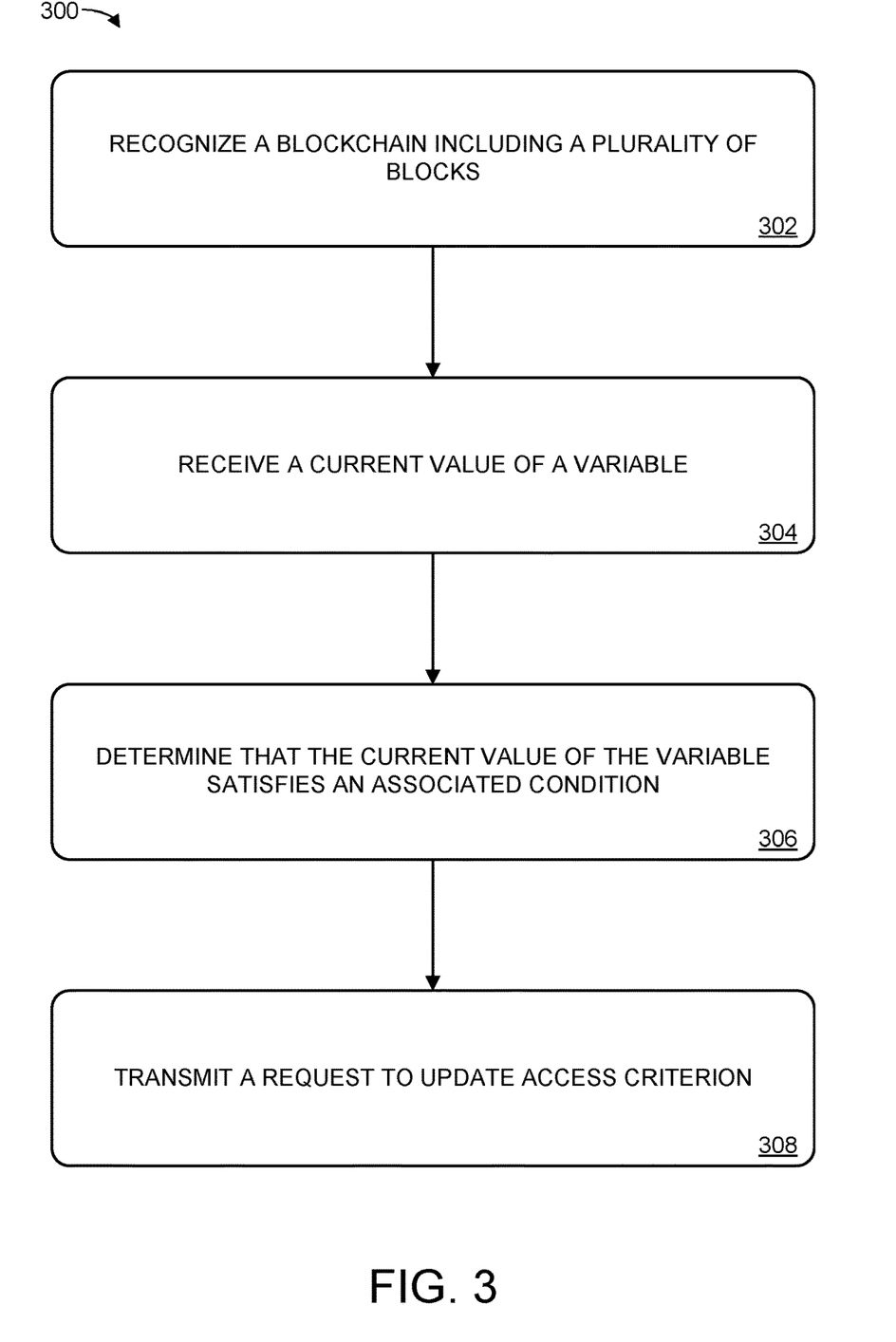
FIG. 3 illustrates an example method for automatically updating access criteria on a blockchain computing device.

The process of updating asset access criteria will be described in more detail with respect to FIG. 3, which illustrates an example method 300 for automatically updating an access criterion on a blockchain computing device. As discussed above, due to the distributed nature of the blockchain, steps of method 300 may be performed by any (or every) computing device maintaining a blockchain. As with the computing devices described above, the blockchain computing device(s) that perform steps of method 300 may have any suitable form factor and hardware configuration. As one example, the blockchain computing device(s) that perform steps of method 300 may be implemented as computing system 700 described below with respect to FIG. 7.

At 302, method 300 includes recognizing a blockchain including a plurality of blocks. As used herein, "recognizing" a blockchain refers to loading one or more blocks of a blockchain into memory such that processing can occur. This may include, as an example, loading blocks of the blockchain into volatile memory from a non-volatile storage machine, which may be on-board or remote (e.g., stored on a remote server).

At 304, method 300 includes receiving a current value of a variable. As discussed above, a smart contract may include one or more functions that, when an associated condition is satisfied, updates a first access criterion for a digital asset to a second access criterion. The condition may be satisfied when one or more variables have specified values. The current value of a variable may be received in any suitable way and from any suitable source. As examples, the current value of a variable may be calculated by software running on the blockchain computing device, retrieved by the blockchain computing device from another device (e.g., a remote server), passively received by the blockchain computing device as part of a transmission—e.g., a message or notification, detected as part of a data entry in the blockchain, etc.

Furthermore, the variable itself may take any suitable form, and can include virtually any information. Such variables may be Boolean values, (e.g., yes/no true/false, 1/0), integer values, float values, strings, and/or any other variables supported by a computer language that the smart contract is written in. As nonlimiting examples, a variable may describe a current time/date, whether a digital asset has been accessed, a number of times the digital asset has been accessed, a location from which the asset was accessed, a date/time at which the asset was accessed, whether a time limit imposed on an entity's access has elapsed, whether a payment was received, the value of a payment received, a date/time at which a payment was received, the current value of a financial asset (e.g., currency, stock price, index value), an indication that a contract breach has occurred, an indication that one or more parties would like to terminate or modify an agreement, etc.

Figure 4:
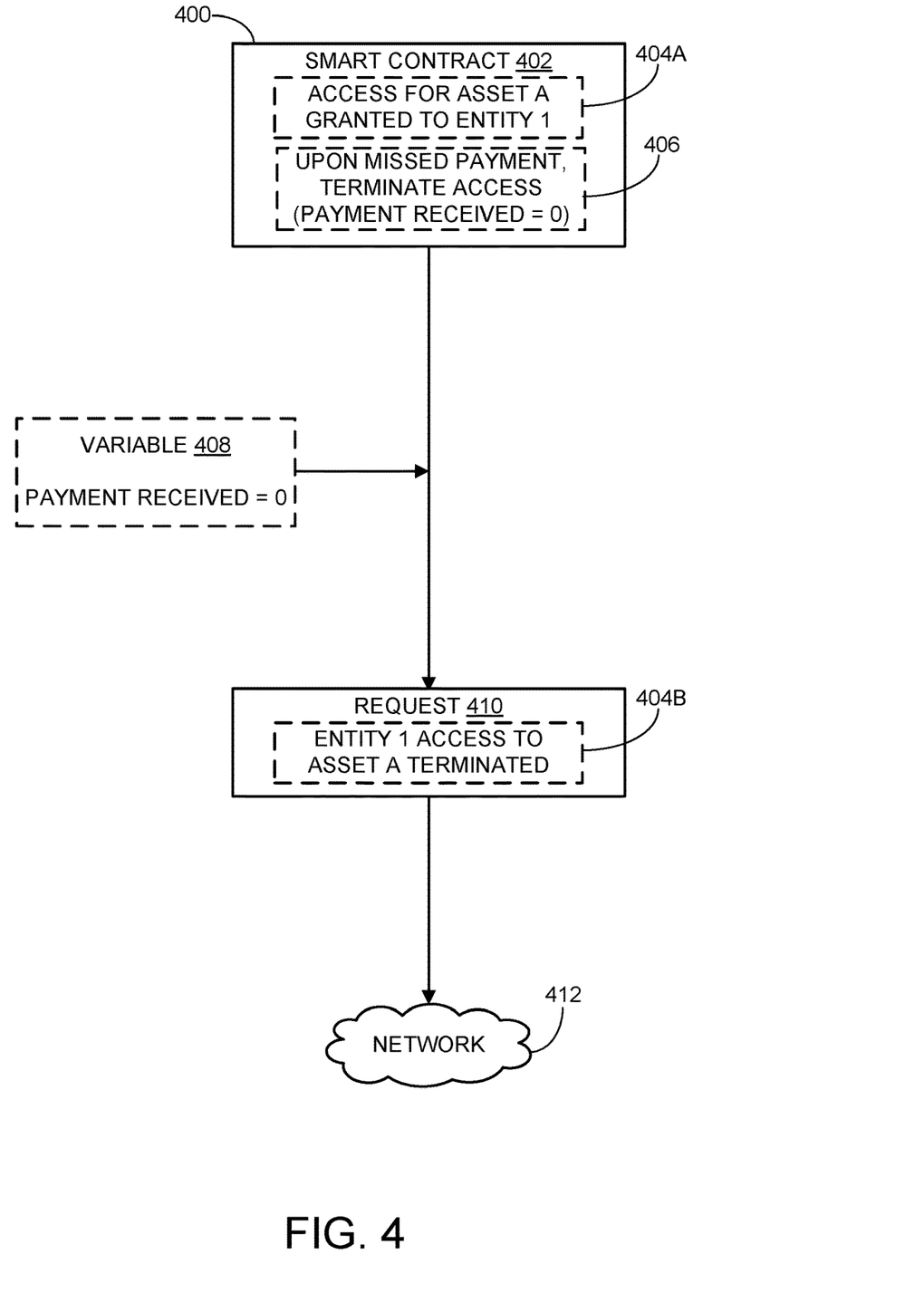
FIG. 4 schematically illustrates updating of access criteria for a digital asset.

This is schematically illustrated in FIG. 4. FIG. 4 shows an example block 400, which may be one block of a longer blockchain. Block 400 includes a smart contract 402, which in turn includes a first access criterion 404A for a digital asset, as well as a function 406. In this case, the first access criterion grants access for a digital asset A to an entity 1. The function stipulates that the access criterion will be updated to a second access criterion (i.e., terminated) upon a missed payment, as indicated by a "payment received" variable having a value of 0.

Also shown in FIG. 4 is the receipt of the current state of a variable 408, which indicates that the payment received variable has a current value of 0. As discussed above, the current value of variable 408 may be received in any suitable way and at any or all of the blockchain computing devices maintaining the blockchain.

Returning briefly to FIG. 3, at 306, method 300 includes determining that the current value of the variable satisfies the condition associated with a function in the smart contract. In the example of FIG. 4, the function terminates the entity's access to the digital asset upon receiving an indication that a payment was missed. Because the current value of the payment received variable indicates that no payment was received (i.e., a value of 0), the condition is satisfied, and the function terminates the access.

Although this example involves only a single function and a single variable, it will be understood that this is nonlimiting. In general, a smart contract may include any number of functions, and each function may alter access criteria in the same or different ways. Indeed, typical implementations will involve significant complexity. Furthermore, each function may include any number of conditions that are each satisfied by any number of variables. For instance, to build upon the earlier example, rather than immediately terminating an entity's access to a digital asset upon a single missed payment, the smart contract may define multiple functions that each progressively restrict the entity's access as payments are missed. After one payment is missed, a first function may reduce an entity's access to a digital asset. As additional payments are missed, additional functions may active and further restrict the access, until eventually a function terminates the entity's access altogether.

Returning again to FIG. 3, at 308, method 300 includes, based on the function, transmitting a request to the plurality of computing devices to update the first access criterion to the second access criterion. In FIG. 4, a request 410 is transmitted to the plurality of computing devices maintaining the blockchain over a network 412. The request includes the second access criterion 404B, which specifies that the access to digital asset A held by entity 1 has been terminated.

Depending on the implementation, the request to update the access criterion can take various forms. In some blockchain implementations, pending data entries (e.g., transactions or other events) may be added to a pool for validation. Once validated, the pending data entries are added to a new block that is distributed between the plurality of computing devices maintaining the blockchain. As discussed above, in some scenarios new blocks are created by miners who compete to generate hash values meeting certain criteria. The first miner to generate a suitable hash validates the pending transactions and adds them to a new block. Thus, after the request to update the access criterion is transmitted, the blockchain computing device may receive, via a communications interface, a proposed update to the blockchain that includes a new block defining the second access criterion.

Figure 5A:
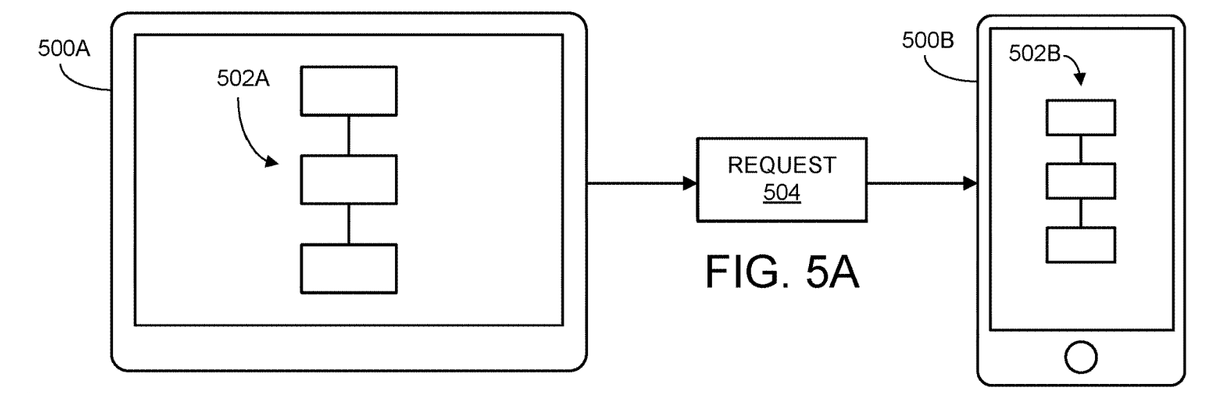
FIG. 5A schematically illustrates transmission of a request to update access criteria for a digital asset.
Figure 5B:
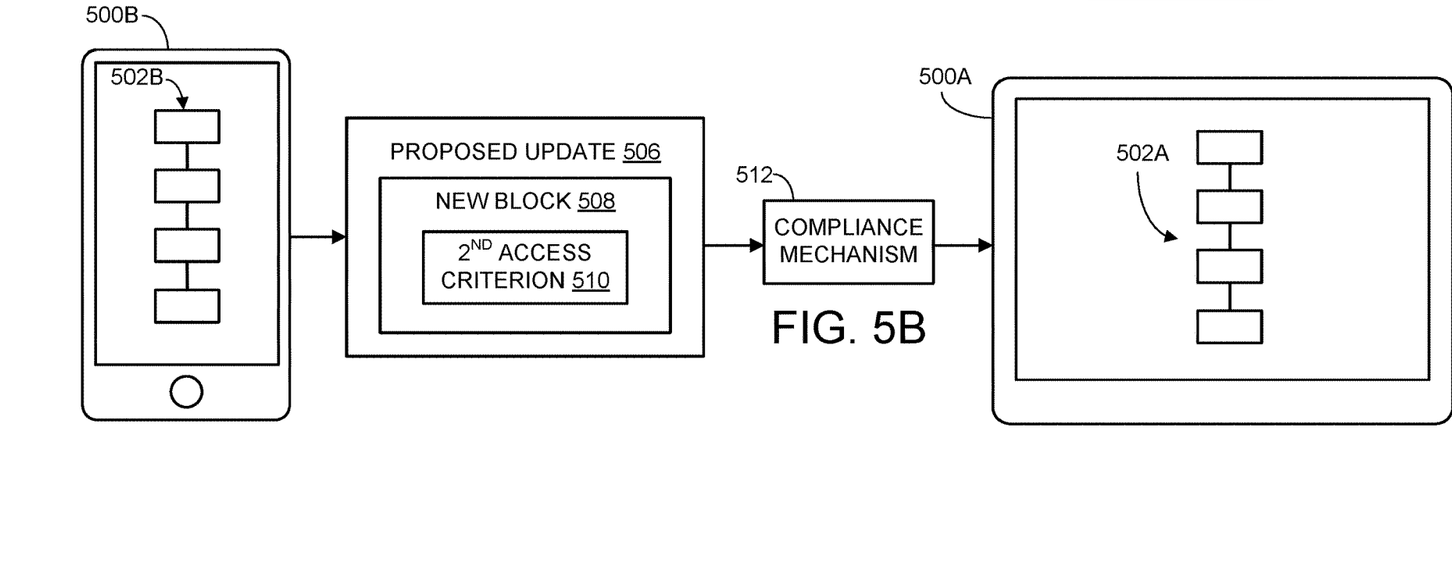
FIG. 5B schematically illustrates receipt of a proposed update to a blockchain including a new block.

This is illustrated in FIGS. 5A and 5B. In FIG. 5A, a blockchain computing device 500A maintaining a local copy of the blockchain 502A transmits a request 504 to update an entity's access to a digital asset from a first access criterion to a second access criterion. This request may be generated after activation of a function defined by a smart contract, as discussed above. The request is received by a different blockchain computing device 500B, which maintains its own local copy of the blockchain 502B. Blockchain computing device 500B is configured to validate pending data entries and add them to the blockchain in new blocks, as discussed above.

In FIG. 5B, blockchain computing device 500B has added a new block to its local copy of the blockchain 502B. Additionally, blockchain computing device 500B transmits a proposed update 506 to the blockchain including a new block 508. The new block defines the second access criterion 510 for the digital asset. In FIG. 5B, once the proposed update is received by blockchain computing device 500A, it is evaluated according to a consensus mechanism. In some scenarios, the consensus mechanism may be a proof-of-work mechanism. As discussed above, in proof-of-work scenarios, each new block to the blockchain will include a unique hash value that was generated to meet certain criteria. Thus, the consensus mechanism may check the validity of such a hash value included in the proposed update, as well as check the included data entries for consistency with prior data entries held by the blockchain.

As an alternative, the consensus mechanism may be a proof-of-stake or proof-of-authority mechanism. In such scenarios, creation of a new block is delegated to an individual or organization based at least in part on their age, contributions, wealth (i.e., in currency-based blockchains), or other factors related to their participation in the blockchain. Thus, evaluating the proposed update via the consensus mechanism may include verifying that the new block was generated by an expected individual or device. The new block may therefore include a unique identifier (e.g., a cryptographically unique signature) that can be definitively linked to the block creator.

Regardless, after determining that the proposed update complies with the consensus mechanism, the new block is incorporated into the blockchain. This is shown in FIG. 5B, in which blockchain computing device 500A incorporates the new block into its local copy of the blockchain 502A. Because a similar process occurs at substantially all computing devices maintaining the blockchain, each local copy of the blockchain remains substantially identical. Furthermore, because new blocks are added to the chain, rather than replacing older blocks, the blockchain maintains the block defining the first access criterion for the digital asset, as well as the new block defining the second, updated access criterion. In this manner, any party can see the complete history of the conditions under which an entity can access the digital asset, even as the access criteria are changed and updated over time.

In alternate implementations, transmitting the request to update the access criterion may simply involve generating a new block that defines the second access criterion. This new block may then be transmitted to the plurality of computing devices for incorporation into the blockchain. This may be the case, for example, when the blockchain computing device that initially updates the access criterion is also a miner that generates a suitable hash, or an individual selected via a proof-of-stake mechanism to create a new block. Furthermore, in private blockchains in which all parties are known and trusted, each node maintaining the blockchain may be authorized to create new blocks as needed without rigorous compliance checks.

Figure 6:
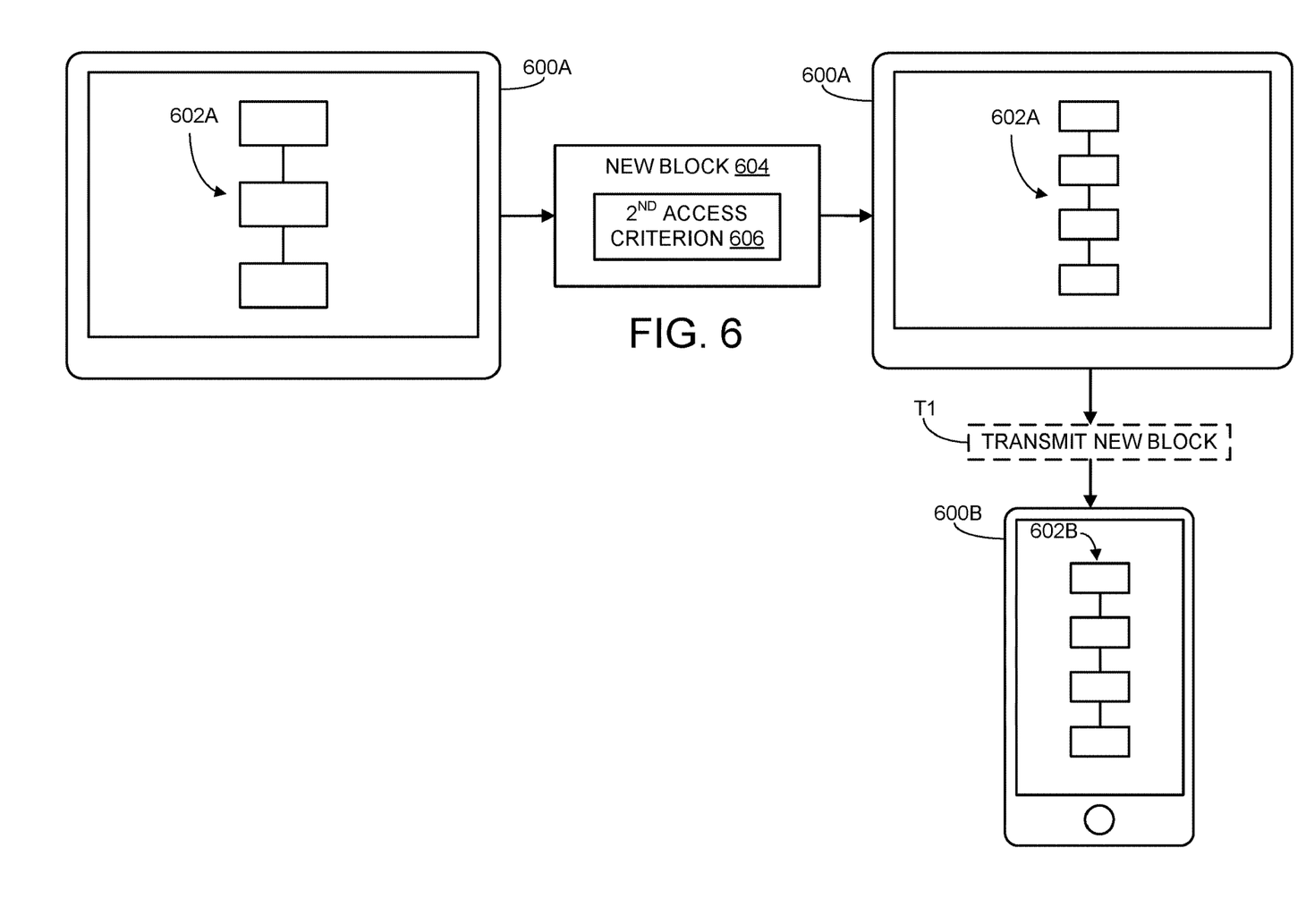
FIG. 6 schematically illustrates transmission of a new block for incorporation into a blockchain.

FIG. 6 schematically illustrates generation and transmission of a new block. Specifically, FIG. 6 shows a blockchain computing device 600A including a local copy of the blockchain 602A. Device 600A generates a new block 604 defining the second access criterion 606 under which an entity can access a digital asset. This is added to the local copy of the blockchain 602A. Furthermore, at T1, the blockchain computing device transmits the new block to another blockchain computing device 600B, which adds the new block to its own local copy of the blockchain 602B.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
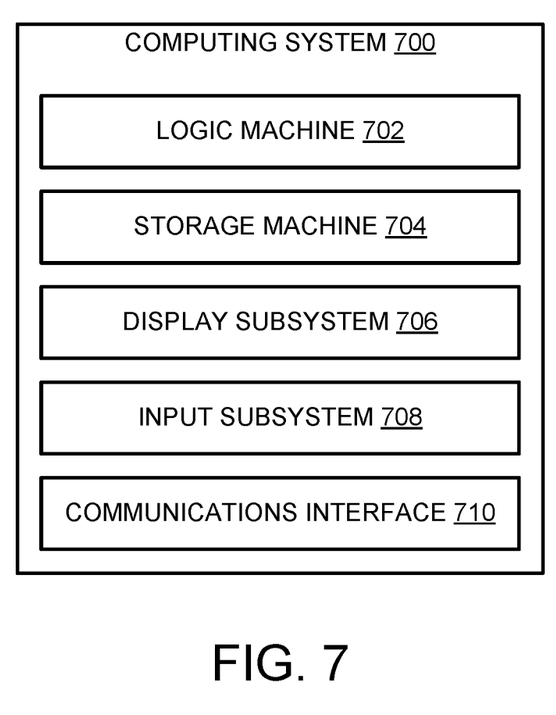
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In an example, a computing device comprises: a communications interface configured to communicatively couple the computing device with a plurality of other computing devices over a network, the plurality of computing devices collectively maintaining a blockchain; a storage machine holding a plurality of blocks comprising the blockchain, where a particular block of the plurality defines a smart contract that includes: (i) a first access criterion granted to an entity for a digital asset, and (ii) one or more functions that, when an associated condition is satisfied, change the first access criterion to a second access criterion, the condition being satisfied when one or more variables have specified values; and a logic machine configured to: receive a current value of a variable; determine that the current value of the variable satisfies the associated condition; and based on the one or more functions, transmit a request to the plurality of computing devices to update the first access criterion to the second access criterion. In this example or any other example, the logic machine is further configured to: via the communications interface, receive a proposed update to the blockchain that includes a new block defining the second access criterion; evaluate the proposed update to the blockchain according to a consensus mechanism; and after determining that the proposed update complies with the consensus mechanism, incorporate the new block into the blockchain. In this example or any other example, the blockchain maintains the particular block defining the first access criterion and the new block defining the second access criterion. In this example or any other example, the consensus mechanism is a proof-of-work mechanism. In this example or any other example, the consensus mechanism is a proof-of-stake mechanism. In this example or any other example, transmitting the request includes generating a new block that defines the second access criterion and transmitting the new block to the plurality of computing devices for incorporation into the blockchain. In this example or any other example, other blocks in the plurality of blocks comprising the blockchain define smart contracts including access criteria granted to other entities for the digital asset. In this example or any other example, other blocks in the plurality of blocks comprising the blockchain define smart contracts including access criteria granted to the entity for other digital assets. In this example or any other example, the second access criterion expands access to the digital asset by the entity. In this example or any other example, the second access criterion grants access to the digital asset to another entity. In this example or any other example, the second access criterion constrains access to the digital asset by the entity. In this example or any other example, the condition is satisfied when a limited time expires. In this example or any other example, the condition is satisfied when a payment is past-due.

In an example, a method for a blockchain computing device comprises: recognizing a blockchain including a plurality of blocks, the blockchain collectively maintained by a plurality of computing devices, where a particular block of the plurality defines a smart contract that includes: (i) a first access criterion granted to an entity for a digital asset, and (ii) one or more functions that, when an associated condition is satisfied, change the first access criterion to a second access criterion, the condition being satisfied when one or more variables have specified values; receiving a current value of a variable; determining that the current value of the variable satisfies the associated condition; and based on the one or more functions, transmitting a request to the plurality of computing devices to update the first access criterion to the second access criterion. In this example or any other example, the method further comprises: receiving a proposed update to the blockchain that includes a new block defining the second access criterion; evaluating the proposed update to the blockchain according to a consensus mechanism; and after determining that the proposed update complies with the consensus mechanism, incorporating the new block into the blockchain. In this example or any other example, transmitting the request includes generating a new block that defines the second access criterion and transmitting the new block to the plurality of computing devices for incorporation into the blockchain. In this example or any other example, other blocks in the plurality of blocks comprising the blockchain define smart contracts including access criteria granted to the entity for other digital assets. In this example or any other example, the second access criterion expands access to the digital asset by the entity. In this example or any other example, the second access criterion constrains access to the digital asset by the entity.

In an example, a distributed blockchain computing system comprises: a plurality of computing devices collectively maintaining a blockchain, the blockchain including a plurality of blocks, where a particular block of the plurality defines a smart contract that includes: (i) a first access criterion granted to an entity for a digital asset, and (ii) one or more functions that, when an associated condition is satisfied, change the first access criterion to a second access criterion, the condition being satisfied when one or more variables have specified values; where a computing device of the plurality is configured to, after receiving an indication that the associated condition has been met, generate an update to the blockchain including a new block that defines the second access criterion, and transmit the update to the blockchain to other computing devices of the plurality; and where each of the plurality of computing devices is configured to evaluate the proposed update according to a consensus mechanism, and after determining that the proposed update complies with the consensus mechanism, incorporate the new block into the blockchain.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a communications interface configured to communicatively couple the computing device with a plurality of other computing devices over a network, the plurality of computing devices collectively maintaining a blockchain;
   a storage machine holding a plurality of blocks comprising the blockchain, where a particular block of the plurality of blocks defines a smart contract that includes: (i) a first access criterion granted to an entity for a digital asset, and (ii) one or in ore functions that, when an associated condition is satisfied, change the first access criterion to a second access criterion, the condition being satisfied when one or in ore variables have specified values; and
   a logic machine configured to:
      receive a current value of a variable;
      determine that the current value of the variable satisfies the associated condition; and
      based on the one or in ore functions, transmit a request to the plurality of computing devices to update the first access criterion to the second access criterion.

2. The computing device of claim 1, where the logic machine is further configured to:
   via the communications interface, receive a proposed update to the blockchain that includes a new block defining the second access criterion;
   evaluate the proposed update to the blockchain according to a consensus mechanism; and
   after determining that the proposed update complies with the consensus mechanism, incorporate the new block into the blockchain.

3. The computing device of claim 2, where the blockchain maintains the particular block defining the first access criterion and the new block defining the second access criterion.

4. The computing device of claim 2, where the consensus mechanism is a proof-of-work mechanism.

5. The computing device of claim 2, where the consensus mechanism is a proof-of-stake mechanism.

6. The computing device of claim 1, where transmitting the request includes generating a new block that defines the second access criterion and transmitting the new block to the plurality of computing devices for incorporation into the blockchain.

7. The computing device of claim 1, where other blocks in the plurality of blocks comprising the blockchain define smart contracts including access criteria granted to other entities for the digital asset.

8. The computing device of claim 1, where other blocks in the plurality of blocks comprising the blockchain define smart contracts including access criteria granted to the entity for other digital assets.

9. The computing device of claim 1, where the second access criterion expands access to the digital asset by the entity.

10. The computing device of claim 1, where the second access criterion grants access to the digital asset to another entity.

11. The computing device of claim 1, where the second access criterion constrains access to the digital asset by the entity.

12. The computing device of claim 11, where the condition is satisfied when a limited time expires.

13. The computing device of claim 11, where the condition is satisfied when a payment is past-due.

14. A method for a blockchain computing device, comprising:
   recognizing a blockchain including a plurality of blocks, the blockchain collectively maintained by a plurality of computing devices, where a particular block of the plurality of blocks defines a smart contract that includes: (i) a first access criterion granted to an entity for a digital asset, and (ii) one or more functions that, when an associated condition is satisfied, change the first access criterion to a second access criterion, the condition being satisfied when one or more variables have specified values;
   receiving a current value of a variable;
   determining that the current value of the variable satisfies the associated condition; and
   based on the one or more functions, transmitting a request to the plurality of computing devices to update the first access criterion to the second access criterion.

15. The method of claim 14, further comprising:
   receiving a proposed update to the blockchain that includes a new block defining the second access criterion;
   evaluating the proposed update to the blockchain according to a consensus mechanism; and
   after determining that the proposed update complies with the consensus mechanism, incorporating the new block into the blockchain.

16. The method of claim 14, where transmitting the request includes generating a new block that defines the second access criterion and transmitting the new block to the plurality of computing devices for incorporation into the blockchain.

17. The method of claim 14, where other blocks in the plurality of blocks comprising the blockchain define smart contracts including access criteria granted to the entity for other digital assets.

18. The method of claim 14, where the second access criterion expands access to the digital asset by the entity.

19. The method of claim 14, where the second access criterion constrains access to the digital asset by the entity.

20. A distributed blockchain computing system, comprising:
   a plurality of computing devices collectively maintaining a blockchain, the blockchain including a plurality of blocks, where a particular block of the plurality of blocks defines a smart contract that includes: (i) a first access criterion granted to an entity for a digital asset; and one or more functions that, when an associated condition is satisfied, change the first access criterion to a second access criterion, the condition being satisfied when one or more variables have specified values;
   where a computing device of the plurality is configured to, after receiving an indication that the associated condition has been met, generate an update to the blockchain including a new block that defines the second access criterion, and transmit the update to the hlockchain to other computing devices of the plurality; and where each of the plurality of computing devices is configured to evaluate the proposed update according to a consensus mechanism, and after determining that the proposed update complies with the consensus mechanism, incorporate the new block into the blockchain.

* * * * *